(12) United States Patent
Tervo et al.

(10) Patent No.: US 7,184,750 B2
(45) Date of Patent: Feb. 27, 2007

(54) SMART TERMINAL REMOTE LOCK AND FORMAT

(75) Inventors: Timo P. Tervo, Oulu (FI); Marko Leukkunen, Oulu (FI)

(73) Assignee: Nokia Corporation, Espoo (FI)

( * ) Notice: Subject to any disclaimer, the term of this patent is extended or adjusted under 35 U.S.C. 154(b) by 188 days.

(21) Appl. No.: 10/813,920

(22) Filed: Mar. 30, 2004

(65) Prior Publication Data

US 2005/0221799 A1   Oct. 6, 2005

(51) Int. Cl.
- H04M 1/66   (2006.01)
- H04M 1/68   (2006.01)
- H04M 3/16   (2006.01)
- H04M 3/00   (2006.01)

(52) U.S. Cl. ............... 455/410; 455/411; 455/418

(58) Field of Classification Search ........... 455/410, 455/411, 414.1, 418, 419, 420
See application file for complete search history.

(56) References Cited

U.S. PATENT DOCUMENTS

| | | | | |
|---|---|---|---|---|
| 5,604,788 A | * | 2/1997 | Tett | 455/412.1 |
| 5,935,219 A | * | 8/1999 | Holmes | 719/315 |
| 5,987,609 A | * | 11/1999 | Hasebe | 726/35 |
| 6,212,410 B1 | * | 4/2001 | Ishida | 455/572 |
| 6,662,023 B1 | | 12/2003 | Helle | |
| 6,865,232 B1 | * | 3/2005 | Isaksson et al. | 375/260 |
| 7,024,698 B2 | * | 4/2006 | Tanaka et al. | 726/26 |
| 2004/0025053 A1 | * | 2/2004 | Hayward | 713/201 |
| 2004/0083472 A1 | * | 4/2004 | Rao et al. | 717/171 |
| 2004/0203601 A1 | * | 10/2004 | Morriss et al. | 455/411 |
| 2004/0204021 A1 | * | 10/2004 | Cocita | 455/550.1 |
| 2004/0224665 A1 | * | 11/2004 | Kokubo | 455/411 |
| 2005/0144251 A1 | * | 6/2005 | Slate | 709/215 |
| 2005/0169446 A1 | * | 8/2005 | Randall et al. | 379/93.23 |
| 2005/0239477 A1 | * | 10/2005 | Kim et al. | 455/456.1 |

FOREIGN PATENT DOCUMENTS

| | | |
|---|---|---|
| EP | 1170969 A1 | 1/2002 |
| EP | 1473952 A1 | 11/2004 |
| GB | 2380356 A | 4/2003 |
| WO | WO 2004114698 A1 | 12/2004 |

* cited by examiner

*Primary Examiner*—Quochien B. Vuong
*Assistant Examiner*—Andrew Wendell

(57) ABSTRACT

A method and mobile terminal are disclosed for use in a wireless communication system, in order to increase security of the mobile terminal when it is lost, stolen, or misplaced by a user. The method includes receiving a guard message at the mobile terminal, authenticating the guard message, locking at least one communication capability of the mobile terminal, and also securing at least some data that is stored in the mobile terminal. Initiation of the method requires inputting a personal identification code at a location separate from the mobile terminal.

19 Claims, 3 Drawing Sheets

SMART TERMINAL REMOTE LOCK AND FORMAT

FIELD OF THE INVENTION

The present invention relates to wireless communication, and more particularly to preventing unauthorized use of a mobile terminal.

BACKGROUND OF THE INVENTION

There are many smart phones and equivalent terminals on the market that are capable of handling a great deal of data. In many cases, this data is critical for the user and/or for the company that the user is working for. The size of these data streams will inevitably increase, and many new applications will be introduced for these terminals. Some of those new applications will handle data that includes secret material in formats such as Word, PowerPoint, and Excel.

Smart phones will be handling documents that are currently handled only by desktop and laptop devices. Currently, laptops are very well-protected against loss and theft, but for mobile terminals such as smart phones there is not yet any global solution that protects information stored in the mobile terminal in case the terminal is lost or stolen, while also guarding against unauthorized usage.

Methods are known for a network to lock a mobile terminal, using an international mobile station equipment identity (IMEI) or subscriber identity module (SIM). An example of present technology is Helle (U.S. Pat. No. 6,662,023) which guards against unauthorized usage and employs a short messaging system, but is incapable of addressing protection of data within the terminal. Most known methods use an operator-provided service, but that does not help to prevent unauthorized data access in the terminal.

Having a mobile terminal stolen or misplaced is in many ways similar to losing an automated teller machine (ATM) card, for example. Even though the ATM card is protected by a user password, it is still conceivable that a criminal who obtains the card might find a way to use it, perhaps after having spied on the user to obtain the password. Therefore, it is wise to request that the bank cancel the user password. Likewise, a password alone is not enough to protect a mobile terminal, because a thief might find a way to bypass, steal, or decipher the password. In some ways, a mobile terminal may be even more vulnerable than an ATM card, if the mobile terminal has valuable documents stored inside of it, whereas an ATM card is almost useless unless it is taken to an ATM machine in order to access a bank account. In this sense, losing the mobile terminal would be similar to losing a memory stick, CD-ROM, or multimedia card (MMC), in which considerable data may be stored.

SUMMARY OF THE INVENTION

The present invention allows a user to easily, securely and quickly format his user data-area, and lock his terminal remotely, via a push message or via Synchronization Markup Language (SyncML) Device Management, in order to prevent unauthorized usage of the terminal. This invention thereby overcomes the problem encountered when the user has lost or forgotten the terminal, or when the terminal is stolen. In such a case, the terminal will be locked and/or the user data-area will be reformatted immediately, in order to prevent unauthorized usage and data leakage from this personal trusted device (PTD).

The present invention provides a method to remotely lock a terminal and format a user data-area by using a Push message or SyncML Device Management. This invention can be user-initiated, or be provided as a service by an operator, or by any corporate entity.

There are two preferred embodiments for implementing the present invention. The first embodiment is light and proprietary (LP). The LP method can be accomplished by sending remote commands to a terminal via an unconfirmed push message. This embodiment fits within the context of the push model standardized by the Wireless Application Protocol (WAP) forum and Open Mobile Alliance (OMA). The command format for this push message is, for example, as follows: user secret pin, command [format, lock]. This format can be encrypted with a symmetric algorithm that is built from a combination of the user personal identification number (PIN) and IMEI, or equivalents. This user PIN is something that the user feeds into the mobile terminal when he enables remote control functions from his terminal.

The other preferred embodiment for implementing the present invention is heavy and open (HO). This embodiment has the same functionality as the LP embodiment, but involves exploiting SyncML functions which require a device management (DM) feature in the terminal. This LP option consumes more memory compared to the push method (LP), due to the size of SyncML DM. However, if a terminal program already has SyncML DM, then this HO option may be preferable to the LP option.

In any case, no matter which embodiment is used (e.g. LP or HO), the present invention entails terminal lock and user data-area handling that can be accomplished for example in a Symbian OS environment by exploiting current Symbian servers such as FS32 (FileSystem). LP requires a light server implementation, and a connection to PushProxy or directly to a short message service center (SMSC). For HO, a terminal management server can be exploited.

DETAILED DESCRIPTION OF THE INVENTION

The light and proprietary (LP) embodiment of the present invention exploits smart messages that may be implemented as bearer-independent objects (BIO), or exploits unconfirmed wireless access protocol (WAP) push messaging. According to the alternative heavy and open (HO) embodiment, implementation is accomplished according to SyncML Device Management.

SyncML DM is very memory-intensive, and many terminals will not be able to support this feature. If a mobile terminal already supports SyncML DM then this may be the most efficient of the two alternative preferred embodiments.

Figure 1:
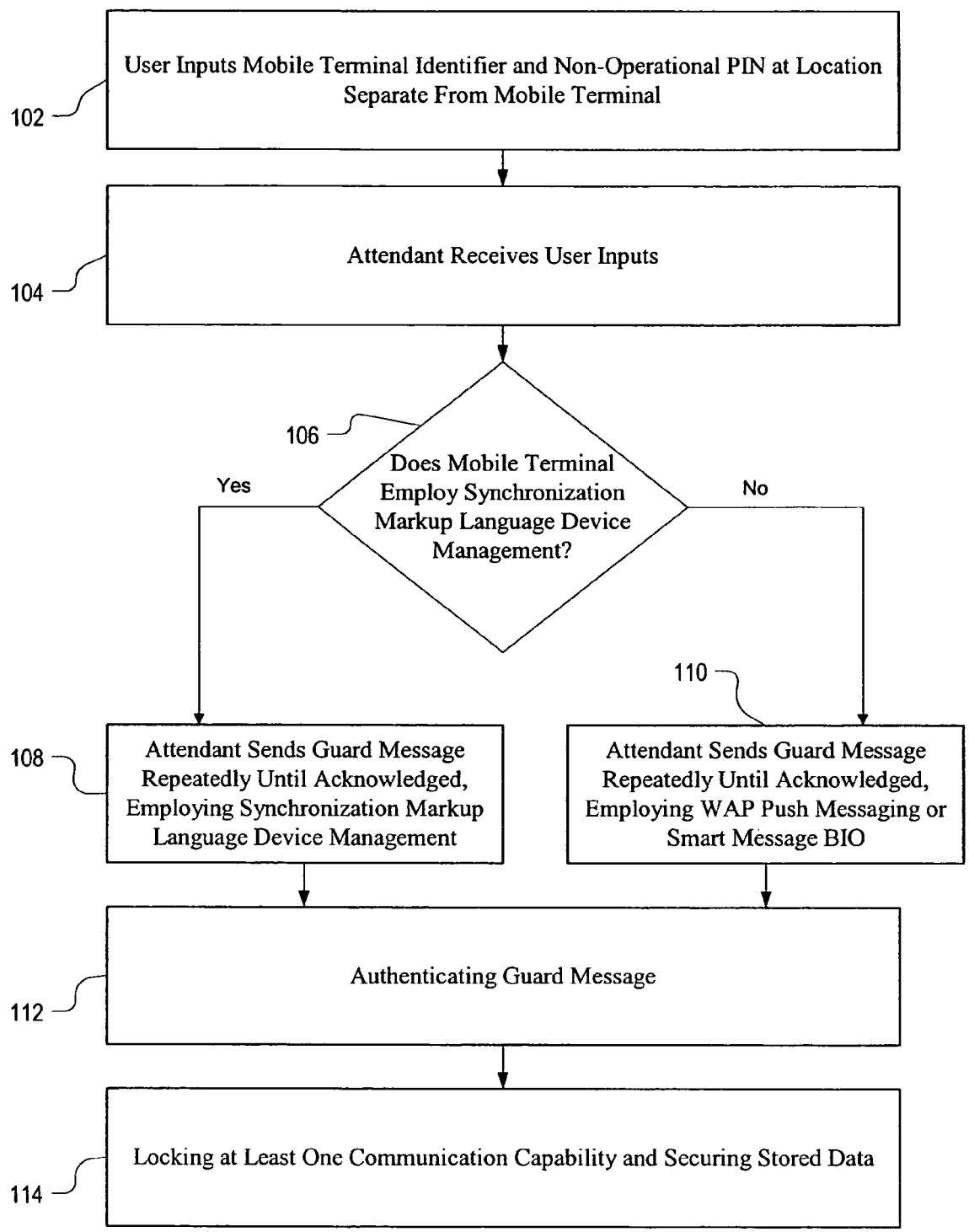
FIG. 1 is a flow chart illustrating an embodiment of the present invention.

Referring now to FIG. 1, this flow chart illustrates a method according to an embodiment of the present invention. The user input 102 a mobile terminal identifier (which may be as simple as a telephone number), plus a personal identification code that is different from a PIN used to operate the mobile terminal, and the user enters these inputs at a location separate from the mobile terminal, which has presumably been lost, misplaced, stolen, or the like. An attendant then receives 104 these user inputs entered in step 102. The attendant may be automated or human or both, and typically would be linked to the user by a telephone connection. The attendant will determine 106 whether the mobile terminal employs synchronization markup language device management. If so, then the attendant will send 108 a guard message using synchronization markup language DM, and will do so repeatedly until the guard message is acknowledged (this is the HO embodiment). However, if the mobile terminal does not employ synchronization markup language DM then the attendant will send 110 the guard message, repeatedly if necessary, using either WAP push messaging or smart message BIO (this is the LP embodiment). The mobile terminal will then authenticate 112 the guard message, which of course could entail verifying the non-operational PIN entered in step 102. If the guard message is authenticated, then the mobile terminal will lock communication and secure data 114. This will not necessarily completely prevent communication from the mobile terminal, but it will at least greatly restrict it, while also making stored data less accessible. Especially sensitive data (or all data) may be deleted, although the user may request that the sensitive data first be uploaded with encryption to the attendant (for safekeeping or transfer to the user), prior to its deletion from the mobile terminal.

A thief might try to remove a battery, or otherwise deprive the mobile terminal of power, in order to ensure that the mobile terminal cannot respond to any guard message, and cannot reveal its location. Therefore, a user may purchase a mobile terminal that is equipped with a small emergency power unit that cannot be easily removed; that small emergency power unit can provide sufficient power for the mobile terminal to respond to the guard message by at least locking communication and securing data, if not by uploading data that is subsequently secured (e.g. deleted).

Regarding message construction, in the LP embodiment, the message content required for terminal format or lock includes push message identifiers: generic push port and meta data (e.g. SecFL). The message content also includes a function: <format> and/or <lock>. And, the message content includes the international mobile station equipment identity: <imei code>. Additionally, the message content includes the user personal PIN: <4-digits, not same as SIM PIN>. The message format could be, for example, extensible markup language (XML) or wireless binary extensible markup language (WBXML) depending upon the selected solution configuration.

Figure 2:
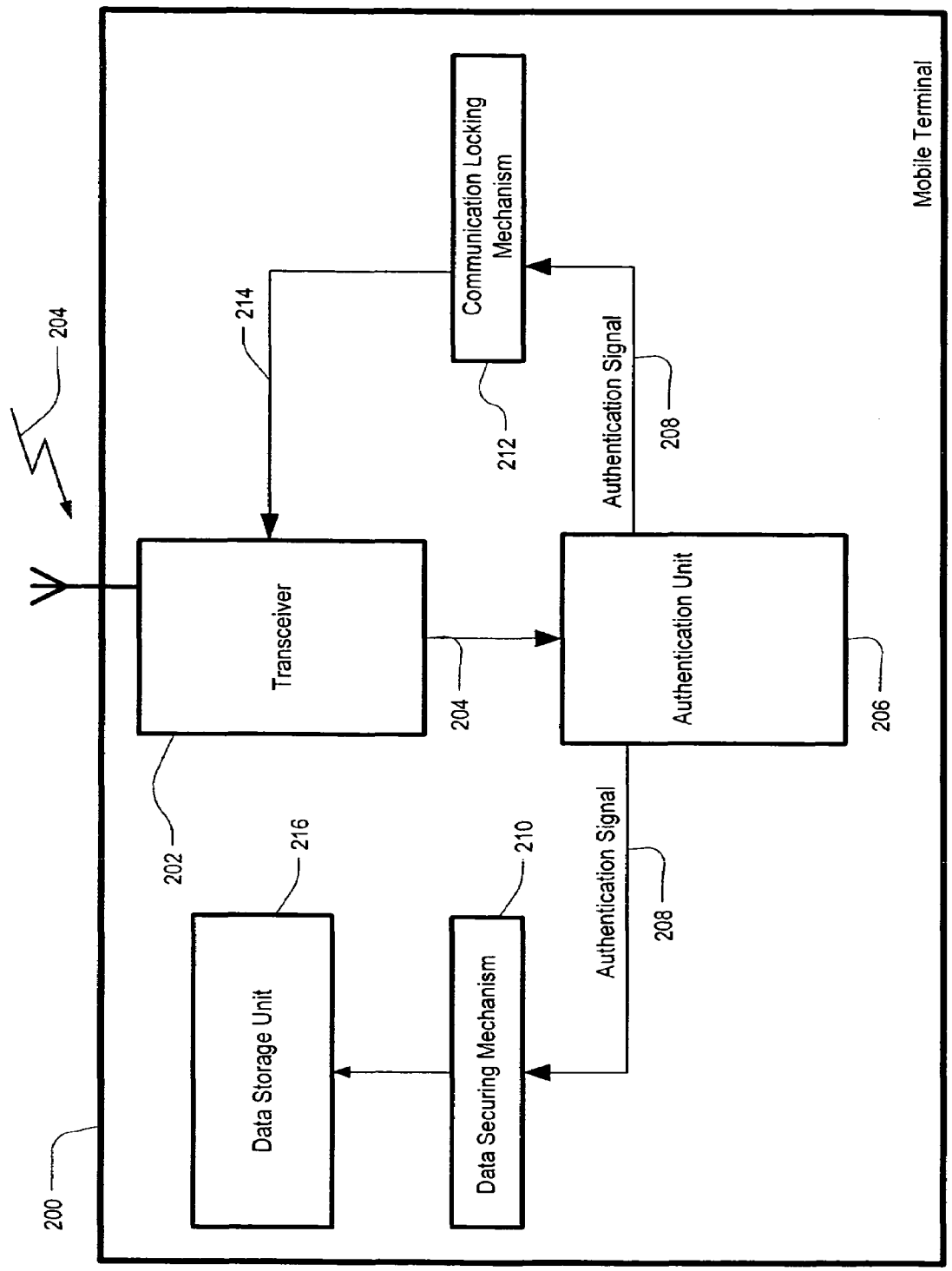
FIG. 2 is a block diagram of a mobile terminal according to the present invention.

Referring now to FIG. 2, this is a block diagram of a mobile terminal 200 according to an embodiment of the present invention. The transceiver 202 receives a guard message 204 which it passes along to an authentication unit 206. Upon authenticating the guard signal 204, the authentication unit provides an authentication signal 208 to a data securing mechanism 210 as well as to a communication locking mechanism 212. In response to the authentication signal 208, the data securing. mechanism 210 secures at least some of the data in a data storage unit 216, for example by deleting that data after encrypting and uploading the data via the transceiver 202. The communication locking mechanism 212 will respond to the authentication signal 208 by sending a disabling signal 214 to the transceiver, so as to completely or partially disable the transceiver (e.g. by barring the transceiver from communicating with any phone number except an emergency number).

Figure 3:
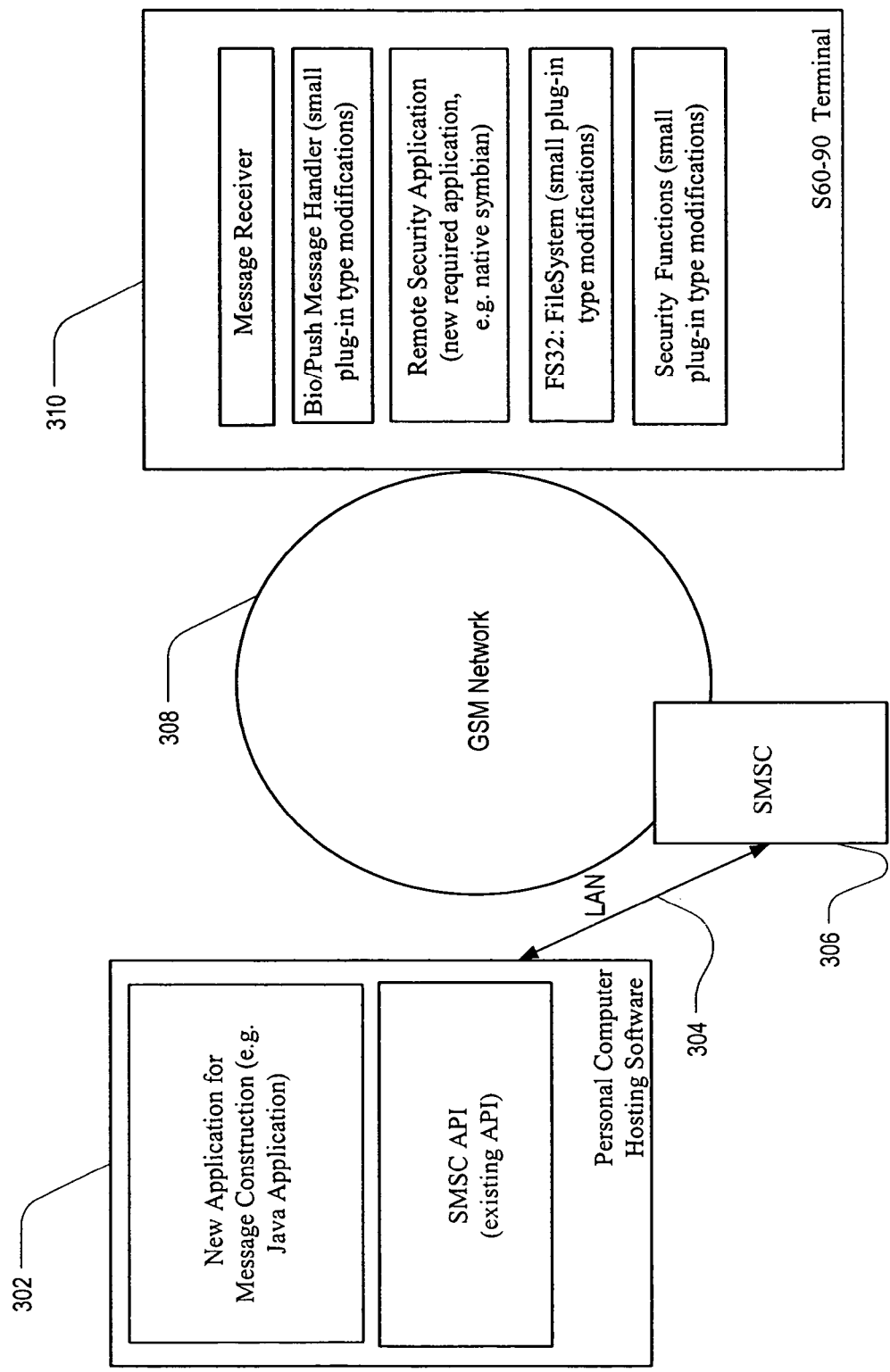
FIG. 3 shows a high-level architecture of a light and proprietary (LP) embodiment of the present invention.

Turning now to FIG. 3, this is a high-level architecture of the light and proprietary (LP) embodiment of the present invention. Regarding requirements for the client and server software in the LP embodiment, the client software 310 allows the user to enable a remote format and lock service from the user interface of his terminal, including entry of the user personal PIN. The terminal software is subsequently executed when a new message is received with appropriate meta information (e.g. SecFL to push port). No user interface should be displayed when the new message is received, because an unauthorized person may be observing the user interface. When the new message is received, then the software verifies the IMEI and user personal PIN. If those are correct, then the terminal software executes functions requested by the content of the new message.

Regarding the server software 302 in the LP embodiment of the present invention, the server has a database that includes IMEI information of users' terminals. The server software has an application programming interface (API) with a short message service center (i.e. an SMSC 306 such as a CIMD-type of SMSC). An attendant, such as an information technology (IT) staff person in the user's company or a telephone operator of a wireless service provider, is able to construct the message that will be sent to the lost or stolen mobile terminal, using the IMEI and PIN that are told by the user to the attendant. Then the message will be sent to a number that is in the database (DB) with the IMEI, via the GSM network 308. This functionality could be easily built inside a manufacturer management system, integrated with other IT management systems, or implemented separately.

Regarding the heavy and open (HO) embodiment of the present invention, the same functionality as the LP embodiment can be achieved by exploiting Synchronization Markup Language (SyncML) device management (DM).

It is to be understood that all of the present figures, and the accompanying narrative discussions of best mode embodiments, do not purport to be completely rigorous treatments of the method, terminal, and system under consideration. A person skilled in the art will understand that the steps and signals of the present application represent general cause-and-effect relationships that do not exclude intermediate interactions of various types, and will further understand that the various steps and structures described in this application can be implemented by a variety of different sequences and configurations, using various different combinations of hardware and software which need not be further detailed herein.

What is claimed is:

1. A method for increasing security of a mobile terminal, comprising:

inputting a personal identification code, at a location separate from a mobile terminal that has been lost, stolen, or misplaced, sending the personal identification code via a telephone connection to an automated or human attendant, receiving the personal identification code and using the personal identification code to determine from a database whether the mobile terminal has a device management feature supporting synchronization markup language, composing a guard message that employs synchronization markup language if the mobile terminal has the device management feature, if the mobile terminal lacks the device management feature, composing the guard message so that the guard message instead employs a smart message implemented as a bearer-independent object or employs wireless access protocol push messaging, sending the guard message from the attendant to the mobile terminal, authenticating the guard message at the mobile terminal, locking at least one communication capability of the mobile terminal, and securing at least some data that is stored in the mobile terminal.

2. The method of claim 1, wherein the guard message employs a smart message implemented as a bearer-independent object, or employs wireless access protocol push messaging.

3. The method of claim 1, wherein the guard message employs synchronization markup language device management.

4. The method of claim 1, wherein the personal identification code is different from a code used to operate the mobile terminal, and wherein initiation of the method also requires inputting a mobile terminal identifier.

5. The method of claim 4, wherein the personal identification code and the code used to operate the mobile terminal are both user-selected.

6. The method of claim 1, wherein the user provides the personal identification code to an attendant, and the attendant then sends the guard message.

7. The method of claim 1, wherein the guard message is sent repeatedly until an acknowledgment is received, or is sent when the mobile terminal is detected to be connected to a network, or both.

8. The method of claim 7, wherein the acknowledgment includes information about where the mobile terminal is located.

9. The method of claim 1, wherein at least some of the stored data is encrypted prior to the uploading, after the receiving of the guard message.

10. A computer readable medium encoded with a software data structure sufficient for performing the method of claim 1.

11. Apparatus for increasing security of a mobile terminal comprising:

a receiver device configured to receive a personal identification code of a mobile terminal that has been lost, stolen, or misplaced;

a database configured to reveal whether the mobile terminal corresponding to the personal identification code has a device management feature supporting synchronization markup language; and a messaging device configured to compose and send a guard message to the mobile terminal;

wherein the messaging device is configured to employ a synchronization markup language if the mobile terminal has the device management feature, if the mobile terminal lacks the device management feature, wherein the messaging device instead is configured to employ a smart message implemented as a bearer-independent object or employs wireless access protocol push messaging, wherein the guard message contains instructions for the mobile terminal to lock at least one communication capability of the mobile terminal, and secure at least some data that is stored in the mobile terminal.

12. The apparatus of claim 11, wherein the guard message employs a smart message implemented as a bearer-independent object, or employs wireless access protocol push messaging.

13. The apparatus of claim 11, wherein the guard message employs synchronization markup language device management.

14. The apparatus of claim 11, wherein the personal identification code is different from a code used to operate the mobile terminal, and wherein transmission of the guard message also requires inputting a mobile terminal identifier.

15. The mobile terminal of claim 14, wherein the personal identification code and the code used to operate the mobile terminal are both user-selected.

16. The apparatus of claim 11, wherein the messaging device is further configured to send the guard message repeatedly until an acknowledgment is received.

17. The apparatus of claim 16, wherein the acknowledgment includes information about where the mobile terminal is located.

18. Apparatus for increasing security of a mobile terminal comprising:

means for receiving a personal identification code of a mobile terminal that has been lost, stolen, or misplaced;

means for revealing whether the mobile terminal corresponding to the personal identification code has a device management feature supporting synchronization markup language; and means for composing and sending a guard message to the mobile terminal;

wherein the guard message employs a synchronization markup language if the mobile terminal has the device management feature, if the mobile terminal lacks the device management feature, wherein the guard message instead employs a smart message implemented as a bearer-independent object or employs wireless access protocol push messaging, wherein the guard message contains instructions for the mobile terminal to lock at least one communication capability of the mobile terminal, and secure at least some data that is stored in the mobile terminal.

19. The apparatus of claim 18, wherein the messaging device is further configured to send the guard message repeatedly until an acknowledgment is received.

* * * * *